United States Patent [19]

Reynolds

[11] Patent Number: 5,017,079

[45] Date of Patent: May 21, 1991

[54] LAMINATED NUT WITH ONE WAY INSTALLATION

[75] Inventor: Richard L. Reynolds, Pointe Shores, Mich.

[73] Assignee: Pac-Fasteners, Southfield, Mich.

[21] Appl. No.: 206,954

[22] Filed: Jun. 9, 1988

Related U.S. Application Data

[63] Continuation of Ser. No. 939,490, Dec. 8, 1986, abandoned.

[51] Int. Cl.⁵ .................. F16B 23/00; F16B 37/08
[52] U.S. Cl. ............................. 411/432; 411/402; 411/433
[58] Field of Search .................. 411/402, 432, 433

[56] References Cited

U.S. PATENT DOCUMENTS

| | | | |
|---|---|---|---|
| D. 208,008 | 6/1967 | Nakajima | 411/432 X |
| 2,358,707 | 9/1944 | Haas | 411/432 X |
| 2,382,748 | 8/1945 | Schüttler | 411/432 |
| 2,761,349 | 9/1956 | Heller | 411/432 |
| 3,511,118 | 5/1970 | Mitchell | 411/427 X |
| 4,269,248 | 5/1981 | MacLean et al. | 411/402 X |
| 4,383,787 | 5/1983 | Reynolds | 411/432 X |

Primary Examiner—Lloyd A. Gall
Attorney, Agent, or Firm—Harness, Dickey & Pierce

[57] ABSTRACT

A laminated nut comprising a plurality of conical spring disc washers and a cage for receiving and holding the disc washers in a stacked, aligned relationship to define a central opening threaded to be matably received upon an associated threaded bolt, including protrusion means extending radially, outwardly from the cage to inhibit gripping of the nut by a wrenching tool at one axial end whereby the nut will only be threaded onto the bolt by the wrenching tool beginning with the opposite end of said nut.

18 Claims, 1 Drawing Sheet

LAMINATED NUT WITH ONE WAY INSTALLATION

This is a continuation of U.S. patent application Ser. No. 939,490, filed Dec. 8, 1986, now abandoned.

SUMMARY BACKGROUND OF THE INVENTION

The present invention relates to free spinning laminated nuts utilizing laminations of hex shaped hardened coned-disc springs, having a central opening tapped to match threads on an associated bolt. Such nuts have stacked aligned multiple discs retained by a steel outer hex shaped cage. The wrenching dimensions are preferably selected to conform to standard SAE-Metric sizes. Examples of such laminated nut structures are shown and discussed in U.S. Pat. No. 4,383,787, issued to Reynolds on May 17, 1983.

The noted laminated nuts are free running on the bolt until seated. A locking force between the nut and bolt results from the application of additional torque and rotation after initial seating. The additional torque compresses and partially flattens the conical spring discs whereby a mechanical interference occurs between the thread flanks of the nut and bolt; it is believed that this is at least partially due to the change in hole size of the nut as the conical discs flatten. The resultant thread interference and retained spring load between thread flanks resists unloading that might otherwise occur as a result of tensile or vibrational loads. Thus, the independently loaded conical spring threaded segments when flattened create a thread interference that tends to lock the nut against rotation or loosening when subject to such loads.

Since the above noted locking action occurs when the laminated nut is applied in one direction, the nut must be correctly oriented onto the associated bolt to assure proper installation. Thus it would be desirable to provide means to inhibit a reverse or incorrect orientation of the nut on to the bolt so as to assure proper installation, whether such installation is done manually or with automatic feed and installation equipment.

In the present invention radial protrusions are formed at one end of the cage such as to provide a means for detecting the appropriate end of the nut to be gripped by a wrench and thus to inhibit improper orientation and installation on the associated bolt.

Therefore it is an object of the present invention to provide an improved laminated nut structure having means on the cage to inhibit a reverse or incorrect orientation and hence improper installation of the nut on to its associated bolt.

Other objects, features, and advantages of the present invention will become apparent from the subsequent description and the appended claims, taken in conjunction with the accompanying drawings, in which:

DETAILED DESCRIPTION

Figure 1:
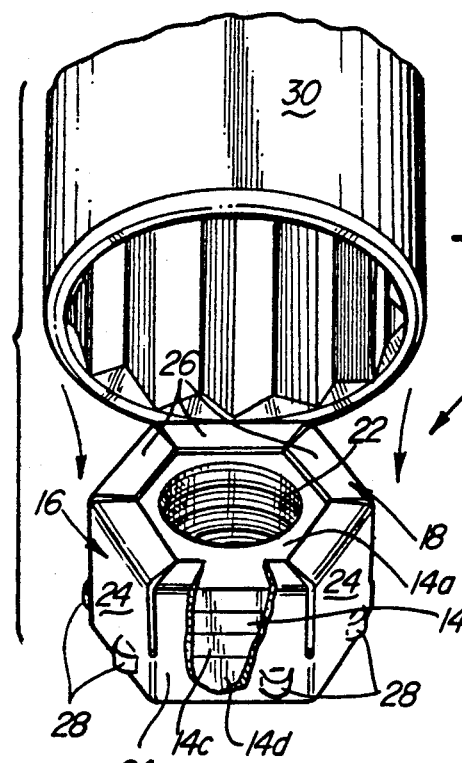
FIG. 1 is a pictorial view of a laminated nut embodying features of the present invention, including a plurality of coned-disc springs held by a cage, with some parts shown broken away and with the socket wrench of an installation tool for the nut partially shown.
Figure 2:
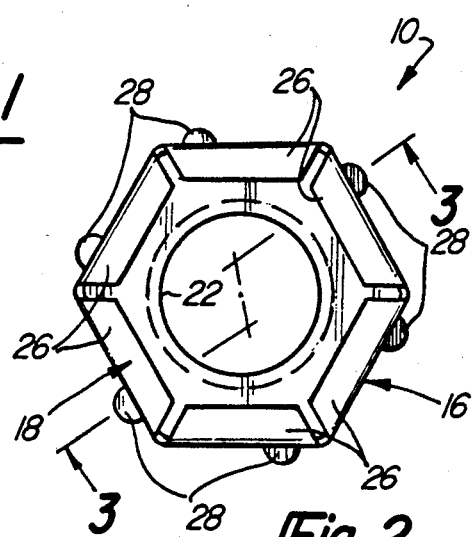
FIG. 2 is a top elevational view of the laminated nut of FIG. 1.

Looking now to the drawings, a laminated nut 10, embodying features of the present invention, is shown prior to installation on an associated bolt 12 (only partially shown). The nut 10 is constructed of a series of hex shaped hardened coned, disc springs 14a–d which are held in an assembled, stacked relationship via a cage 16. The laminated nut 10 has a top side 18 and a bottom side 20. As noted in order to secure the desired locking feature between nut and bolt, the nut 10 should be mounted on the bolt 12 with the bottom side 20 being the leading end of the nut 10 as it is threaded onto the bolt 12 and hence with the top side 18 being the trailing end of the nut 10. As shown in the drawings, the laminations or springs 14a–d define a central bore 22 which is threaded to be matably, threadably received upon the bolt 12. Thus when properly installed, the laminations or disc springs 14a–d are initially dished centrally outwardly from the bolt 12 or axially outwardly from the bottom side 20 towards the top side 18.

The cage 16 can be formed of sheet metal and includes an annular bottom ring or cup portion 23 and a plurality of axially extending fingers 24. In one form of the invention the cage was constructed of spring steel having a Rockwell hardness of between around Rc 39 and Rc 45.

In the form of the invention shown, six fingers 24 are circumferentially arranged in a hexagonal pattern around the periphery of the ring portion 23 with each engaging a corresponding flat of the hexagonally shaped outer surface of the laminations or disc springs 14a–d. The outer end portions 26 of the fingers 24 are folded radially inwardly to grip the uppermost disc spring 14a. Also the bottom surface of the ring portion 23 can be dished axially inwardly to generally conform to the dished contour of the lowermost disc spring 14d.

In order to inhibit improper orientation of the laminated nut 10 onto the bolt 12 the cage 16 is provided with a plurality of radially outwardly extending protrusions 28. The protrusions 28 are located at the base or lower extremity of the cage 16 i.e. at the lower extremity of the cage fingers 24 or cup portion 23. The protrusions 28 are preferably at the extreme lower end of the cage 16 in order to provide as little effective wrenching area as possible at the bottom side 20 of the nut 10 in order to inhibit an operator from installing the laminated nut 10 in a reverse or improper direction on the bolt 12. While one protrusion 28 is provided at the base of each of the cage fingers 24 a plurality of protrusions less than six could be effectively used. The protrusions 28 as shown are generally arcuately shaped and of a limited circumferential extent to facilitate formation during the blanking in the construction of the cage 16. It is believed that by limiting the circumferential extent of the protrusions 28 any adverse effect on the strength of the cage 16 will be minimized. This limited circumferential length of each of the protrusions 28 is preferably less than around one half of the circumferential length of the associated one of the sides of the nut 10.

Figure 3:
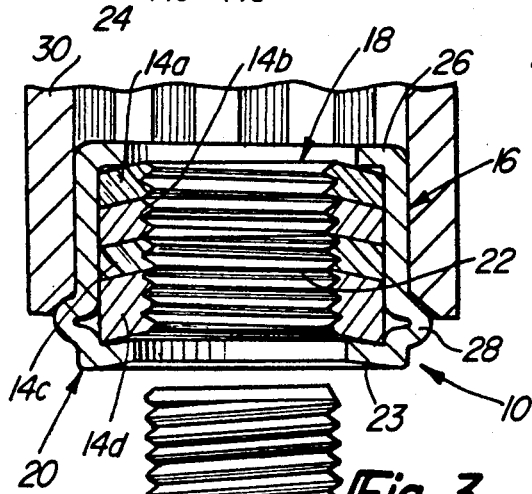
FIG. 3 is a side elevational view of the laminated nut of FIG. 1, with some parts shown broken away, for installation on an associated bolt, only partially shown, with the tool partially shown and in driving relationship on the laminated nut.
Figure 4:
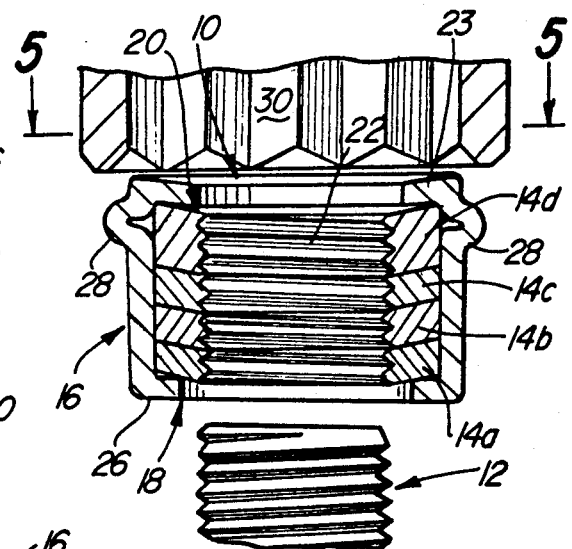
FIG. 4 is a view similar to FIG. 3 depicting the laminated nut improperly oriented relative to the associated bolt and installation tool.
Figure 5:
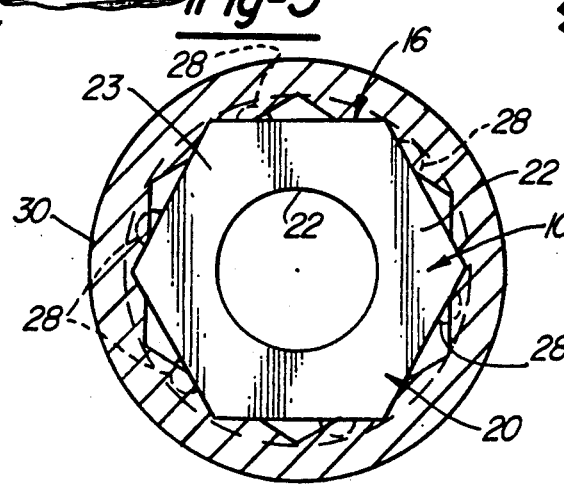
FIG. 5 is a view taken in the direction of the lines 5—5 in FIG. 4 illustrating the interference provided by protrusions on the nut inhibiting the nut from being received within the wrench socket.

The laminated nut 10 is adapted to be installed by a conventional socket wrench 30 (see FIGS. 1 and 3) which is adapted to receive and engage the corners of the nut 10. As can be seen from FIGS. 4 and 5, the protrusions 28 inhibit such engagement from the bottom side 20 of the nut 10. It should be noted that the fingers 24 extend width wise along the flats of the disc springs 14a-d such that they end near one of the hexagonal corners defined by the stack of disc springs 14a-d; the protrusions 28 are located substantially at one end of the base of the fingers 24 near one of these corners; this location near the corners resists overriding by the socket wrench 30 especially where the wrench 30 is of a type having a generally circular opening having twelve engaging points and which is adapted to grip the nut 10 generally solely at its corners. Thus it can be seen from the drawings (FIGS. 4 and 5) that with the latter type wrench the protrusions 28 prevent engagement and driving of the nut 10 from the wrong end. Also, with the protrusions 28 located at one axial extremity of the nut 10, the wrenching surfaces of the wrench 30 can be fully engaged along the axial length of the corners of the nut 10 to provide full bearing surfaces when the nut 10 is properly engaged for installation in the correct direction.

The protrusions also provide for obvious visual orientation and limit driving engagement during installation with hand service tools such as box, open ends or adjustable wrenches.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A threaded fastener assembly comprising:
a threaded bolt member, a laminated nut having a plurality of circumferentially, externally disposed corners adapted to be gripped by mating surfaces on a wrenching tool for installation onto said bolt member, said nut comprising a plurality of conical spring disc washers, said disc washers oriented to provide load retention when threaded onto said bolt member with one axial end being the leading end on said bolt member, a cage for receiving and holding said disc washers in a stacked, aligned relationship to define a central opening threaded to be matably received upon said bolt member, said cage including a ring portion and a plurality of axially extending fingers cooperating with said ring portion to hold said disc washers in said stacked, aligned relationship, and protrusion means extending radially, outwardly from a location proximate to said one axial end of said cage to prevent gripping of said nut by the wrenching tool at said one axial end whereby said nut will only be threaded onto said bolt member by engagement of the wrenching tool with the opposite end of said nut, said protrusion means being substantially non-load bearing after installation onto said bolt member, and said nut having an external configuration which, except for the interference provided by said protrusion means, would permit gripping by the wrenching tool at said one axial end.

2. The threaded fastener assembly of claim 1 with said protrusion means comprising a plurality of protrusions extending radially outwardly from said cage at locations proximate to different ones of said fingers.

3. The threaded fastener assembly of claim 2 with said plurality of protrusions extending radially outwardly from said cage at locations proximate to the externally disposed corners of said nut.

4. The threaded fastener assembly of claim 3 with said plurality of protrusions being of a limited width which is less than around one half of the width of said different ones of said fingers.

5. A threaded fastener assembly comprising:
a threaded bolt member, a laminated nut having an outer surface with a plurality of flat sides defining a plurality of corners adapted to be gripped by mating surfaces on a wrenching tool for installation onto said bolt member, said nut comprising a plurality of conical spring disc washers, said disc washers oriented to provide load retention when threaded onto said bolt member with one axial end being the leading end on said bolt member, a cage for receiving and holding said disc washers in a stacked, aligned relationship to define a central opening threaded to be matably received upon said bolt member, said cage including a ring portion and a plurality of axially extending fingers cooperating with said ring portion to hold said disc washers in said stacked, aligned relationship, a plurality of protrusions extending radially outwardly from a location proximate to said one axial ned of said cage to prevent gripping of said nut by the wrenching tool at said one axial end whereby said nut will only be threaded onto said bolt member by engagement of the wrenching tool with the opposite end of said nut, said protrusions being substantially non-load bearing after installation onto said bolt member, said nut having an external configuration which, except for the interference provided by said protrusions, would permit gripping by the wrenching tool at said one axial end.

6. The threaded fastener assembly of claim 5 with said protrusions extending radially outwardly from said cage at locations proximate to different ones of said fingers.

7. The threaded fastener assembly of claim 6 with said protrusions extending radially outwardly from said cage at locations proximate to the externally disposed corners of said nut.

8. The threaded fastener assembly of claim 7 with said disc washers having flat surfaces which with said cage define the flat sides of said nut, said different ones of said fingers extending circumferentially along associated ones of said flat surfaces on said disc washers for an extent substantially co-extensively with said flat surfaces of said disc washers with said protrusions located proximate to the associated one of said corners.

9. The threaded fastener assembly of claim 8 with said protrusions extending circumferentially for no more than around one half of the circumferential length of the said different ones of said fingers.

10. A threaded fastener assembly comprising:
a threaded bolt member, a laminated nut having a plurality of flat sides in a hexagonal shape defining a plurality of corners and adapted to be gripped by mating surfaces on a wrenching tool for installation onto said bolt member, said nut comprising a plurality of conical spring disc washers, said disc washers oriented to provide load retention when threaded onto said bolt member with one axial end being the leading end on said bolt member, a cage for receiving and holding said disc washers in a stacked aligned relationship to define a central opening threaded to be matably received upon said bolt member, said disc washers having a plurality of flat surfaces defining in part the flat sides of said nut, said cage comprising a ring portion and a plurality of axially extending fingers cooperating with said ring portion to hold said disc washers in said stacked, aligned relationship, radially outwardly extending protrusions at a location proximate to one axial extremity of said cage and proximate to said fingers to prevent gripping of said nut by the wrenching tool at the axial end of said nut corresponding to said one axial extremity whereby said nut will only be threaded onto said bolt member by engagement of the wrenching tool with the opposite axial extremity of said nut, said protrusions being substantially non-load bearing after installation onto said bolt member, said nut having an external configuration which, except for the interference provided by said protrusions, would permit gripping by the wrenching tool at said one axial extremity.

11. The threaded fastener assembly of claim 10 with said protrusions being located proximate to the associated one of said corners.

12. The threaded fastener assembly of claim 10 with said cage having six fingers, one for each of said flats.

13. The threaded fastener assembly of claim 11 with one of said protrusions being located on said cage proximate to each of said corners.

14. The threaded fastener assembly of claim 11 with said protrusions extending circumferentially for no more than around one half of the circumferential extent of the flat sides of said nut.

15. The threaded fastener assembly of claim 11 with said protrusions being generally arcuately shaped.

16. The threaded fastener assembly of claim 14 with said protrusions being generally arcuately shaped.

17. A fastening system for securing workpieces together comprising:
a threaded bolt member,
a laminated nut adapted to be threadably engaged onto said bolt member,
a wrenching tool having a cavity with a plurality of mating surfaces adapted to engage flats or corners on a multisided nut member,
said laminated nut having a plurality of circumferentially, externally disposed corners adapted to be gripped by said mating surfaces on said wrenching tool for installation onto said threaded bolt member for securing the workpieces together, said nut comprising a plurality of conical spring disc washers, said disc washers oriented to provide load retention when threaded onto said bolt member with one axial end being the leading end on said bolt member, a cage for receiving and holding said disc washers in a stacked, aligned relationship to define a central opening threaded to be matably received upon said bolt member, said cage including a ring portion and a plurality of axially extending fingers cooperating with said ring portion to hold said disc washers in said stacked, aligned relationship, and protrusion means extending radially, outwardly from a location proximate to said one axial end of said cage to prevent movement of said nut into said cavity past said protrusion means to prevent gripping of said nut by said wrenching tool at said one axial end, said nut having a generally uniform external configuration which, except for the interference provided by said protrusion means, would permit full movement of said nut into said cavity and gripping by said wrenching tool from either said one or said opposite axial end, said protrusion means operative by said interference such that said nut can only be threaded onto said bolt member by substantial movement of said nut into said cavity from said opposite end for permitting full, effective engagement of said wrenching tool with said opposite end of said nut, said protrusion means being axially spaced from said one axial end such as to be substantially non-load bearing axially relative to the workpieces after threaded installation onto said bolt member.

18. A fastening system for securing workpieces together comprising:
a threaded bolt member,
a laminated nut adapted to be threadably engaged onto said bolt member,
a wrenching tool having a cavity with a plurality of mating surfaces adapted to engage flats or corners on a multisided nut member,
said laminated nut having an outer surface with a plurality of flat sides defining a plurality of corners adapted to be gripped by said mating surfaces on said wrenching tool for installation onto said bolt member for securing the workpieces together, said nut comprising a plurality of conical spring disc washers, said disc washers oriented to provide load retention when threaded onto said bolt member with one axial end being the leading end on said bolt member, a cage for receiving and holding said disc washers in a stacked, aligned relationship to define a central opening threaded to be matably received upon said bolt member, said cage including a ring portion and a plurality of axially extending fingers cooperating with said ring portion to hold said disc washers in said stacked, aligned relationship, a plurality of protrusions on said cage extending radially outwardly from a location proximate to said one axial end of said cage to prevent movement of said nut into said cavity past said protrusions to prevent gripping of said nut by said wrenching tool at said one axial end, said nut having a generally uniform external configuration which, except for the interference provided by said protrusions, would permit full movement of said nut into said cavity and gripping by said wrenching tool from either said one or said opposite axial end, said protrusions operative by said interference such that said nut can only be threaded onto said bolt member by substantial movement of said nut into said cavity from said opposite end for permitting full, effective engagement of said wrenching tool with said opposite end of said nut, said protrusions being axially spaced from said one axial end and from the confronting surface of the workpieces such that said protrusions are substantially non-load bearing axially after installation onto said bolt member.

* * * * *

UNITED STATES PATENT AND TRADEMARK OFFICE
CERTIFICATE OF CORRECTION

PATENT NO. : 5,017,079
DATED : May 21, 1991
INVENTOR(S) : Richard L. Reynolds

It is certified that error appears in the above-indentified patent and that said Letters Patent is hereby corrected as shown below:

On the title page, item [75] Inventor: before "Pointe" insert --Grosse--.

Column 4, line 31, Claim 5, delete "ned" and substitute therefor --end--.

Signed and Sealed this

Seventeenth Day of August, 1993

*Attest:*

BRUCE LEHMAN

*Attesting Officer*  *Commissioner of Patents and Trademarks*